(12) United States Patent
Rice et al.

(10) Patent No.: US 8,823,265 B2
(45) Date of Patent: Sep. 2, 2014

(54) SEQUENTIAL VEHICLE SIGNALING SYSTEM AND METHOD

(75) Inventors: Lawrence M. Rice, Hillsboro, NH (US); Thomas Tessnow, Weare, NH (US); Howard Eng, Hancock, NH (US)

(73) Assignee: Osram Sylvania Inc., Danvers, MA (US)

( * ) Notice: Subject to any disclaimer, the term of this patent is extended or adjusted under 35 U.S.C. 154(b) by 498 days.

(21) Appl. No.: 13/165,988

(22) Filed: Jun. 22, 2011

(65) Prior Publication Data

US 2012/0326606 A1    Dec. 27, 2012

(51) Int. Cl.
*B60Q 1/34* (2006.01)
*B60Q 1/26* (2006.01)
*B60Q 1/38* (2006.01)

(52) U.S. Cl.
CPC ... *B60Q 1/38* (2013.01); *B60Q 1/26* (2013.01)
USPC ............... 315/77; 315/82; 315/291; 315/307; 340/468; 340/469; 340/475

(58) Field of Classification Search
USPC ................... 315/76, 77, 80, 82, 84, 291, 307; 340/425.5, 433, 438, 465, 469, 471
See application file for complete search history.

(56) References Cited

U.S. PATENT DOCUMENTS

| | | |
|---|---|---|
| 3,484,743 A | 12/1969 | Stencil et al. |
| 3,618,010 A | 11/1971 | Suzuki |
| 5,136,483 A | 8/1992 | Schoniger et al. |
| 6,414,437 B1 * | 7/2002 | Diez et al. .................. 315/77 |
| 6,573,830 B2 | 6/2003 | Cohen et al. |
| 6,998,970 B2 | 2/2006 | Conte |
| 2003/0007362 A1 | 1/2003 | Robinson |
| 2003/0107863 A1 | 6/2003 | Kelwaski |
| 2005/0062597 A1 * | 3/2005 | Su .............................. 340/475 |
| 2006/0133103 A1 * | 6/2006 | Muhlbaier et al. ............ 362/545 |
| 2007/0194903 A1 | 8/2007 | Walasik |
| 2009/0051522 A1 | 2/2009 | Perkins |

* cited by examiner

*Primary Examiner* — Douglas W Owens
*Assistant Examiner* — Thai Pham
(74) *Attorney, Agent, or Firm* — Edward S. Podszus (57) ABSTRACT

An illumination apparatus (12) for use with a vehicle (10) includes a lighting system (14) and a controller (16). The lighting system (14) includes at least three light engines (18). The controller (16) is configured to simultaneously illuminate at least two of the light engines (18) while simultaneously not illuminating at least one of the light engines (18) upon activation of the illumination apparatus. The controller (16) is further configured to alternate which of the light engines (18) are not illuminated and which two of the light engines (18) are simultaneously illuminated such that at least two light engines (18) are simultaneously illuminated during the entire illumination sequence. As such, at least two light engines (18) are illuminated upon activation of the illumination apparatus (12).

20 Claims, 6 Drawing Sheets

SEQUENTIAL VEHICLE SIGNALING SYSTEM AND METHOD

CROSS REFERENCE TO RELATED APPLICATIONS

Not applicable.

TECHNICAL FIELD

The present disclosure relates to illumination systems, and more particularly pertains to illumination systems and methods for providing a sequential turn signal with a unique lighting sequence.

BACKGROUND

Sequential turn signals are not only designed to function as illumination sources for a motor vehicle, but also as an aesthetic design feature of the motor vehicle. For example, U.S. Patent Pub. Nos. 2006/013313 (Muhlbaier), 2009/0051522 (Perkins), 2007/0194903 (Walasik), 2003/0007362 (Robison), 2003/0107863 (Kelwaski) as well as U.S. Pat. No. 6,573,830 (Cohen), U.S. Pat. No. 5,136,483 (Schoeniger), U.S. Pat. No. 3,618,010 (Suzuki), U.S. Pat. No. 6,998,970 (Conte), and U.S. Pat. No. 3,484,743 (Stancil) are all generally directed to sequential turn signals. It is known in prior art turn signals that the illumination sequence begins with the illumination of a single light source; thereafter, additional light sources in the turn signals are sequentially turned on.

As may be appreciated, however, a turn signal must comply with various regulatory guidelines in order to be used on automobiles. These regulatory guidelines require, among other things, that the turn signal must pass certain photometric requirements upon activation. One disadvantage of the above turn signals is that the first light source must comply with all of the various regulatory guidelines in order to be used on an automobile. Accordingly, the first light source must be large enough to provide sufficient photometric properties to pass the photometric requirements upon activation without the aid of the additional light sources. Moreover, the additional light sources must also be designed to provide similar photometric properties so that (a) the turn signal has a similar appearance to the first light source as the additional light sources are illuminated in the illumination pattern, and (b) commonality of parts on an assembly line or as replacement parts is ensured but with the disadvantageous result of excess light output and the resulting expensive inefficiency. As a result, the turn signal is very complex and expensive to manufacture and the additional light generated by the subsequently illuminated light sources in the turn signal is, in a sense, wasted because it does not aid in complying with the regulatory requirements.

BRIEF DESCRIPTION OF THE DRAWINGS

Features and advantage of the claimed subject matter will be apparent from the following description of embodiments consistent therewith, which description should be considered in conjunction with the accompanying drawings, wherein:

DETAILED DESCRIPTION

By way of an overview, one aspect consistent with the present disclosure may feature one or more illumination systems (e.g., a turn signal system) for use with a motor vehicle. The illumination system includes a controller and a lighting system having at least three light engines. The controller is configured to simultaneously illuminate at least two of the light engines while simultaneously not illuminating at least one of the light engines upon activation of the illumination system. The controller is further configured to alternate which of the light engines is not illuminated to generate an illumination pattern (e.g., an illumination pattern simulating a sequentially moving light source). Because at least two light engines are illuminated upon activation of the illumination system, each light engine may be selected to have photometric properties which are lower than the applicable regulatory requirements for the illumination system as long as the combination of illuminated light engines meets and/or exceeds the applicable regulatory requirements. Accordingly, smaller, cheaper, and/or more efficient light engines may be used thereby reducing the cost and complexity of the illumination system, while still ensuring that the illumination system will pass the applicable regulatory requirements (for example, but not limited to, as described in 49 C.F.R. §571, also known as the Federal Motor Vehicle Safety Standards (FMVSS), and more specifically 49 C.F.R. §571.108) as well as provide an aesthetically pleasing design feature in the desired regions where the lamp is to be used, e.g., the United States of America or Europe. The surprising visual effect, in contrast to the prior art, is to implement an attention-grabbing visual display whereby the visual cue to observers that appears to move as a signal across the face of the lamp assembly is a dark, unlit region contrasting against an apparently lit background, see, for example, the unlit region progressing from right to left of the lamp assembly depicted in the sequence of figures in FIGS. 4-6 hereinbelow implementing a rear turn signal to indicate a left turn. For ease of explanation, an illuminated light engine 18 is illustrated with crosshatching whereas a non-illuminated light engine 18 is illustrated without crosshatching.

Figure 1:
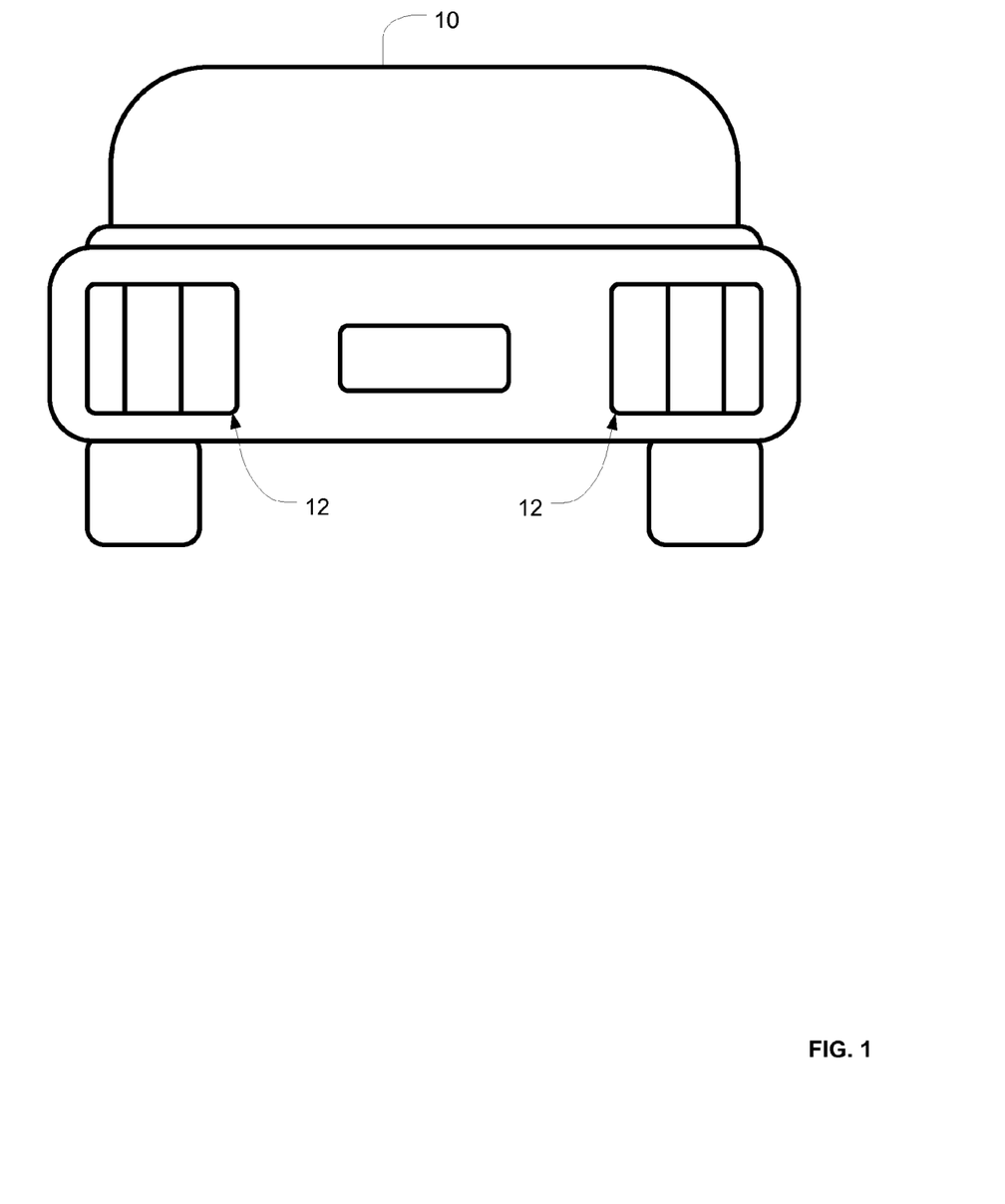
FIG. 1 illustrates one embodiment of vehicle having an illumination system consistent with the present disclosure.

Turning now to FIG. 1, one embodiment of a vehicle 10 including one or more illumination systems 12(1)-(n) consistent with the present disclosure are generally illustrated. The vehicle 10 may include, but is not limited to, a car, truck, or the like. While the illumination systems 12(1)-(n) are illustrated mounted to the rear of the vehicle 10, this is just for illustrative purposes and one or more illumination systems 12(1)-(n) may be mounted to the front and/or sides of the vehicle. The illumination systems 12(1)-(n) may include, but are not limited to, a turn signal system, brake light system, emergency warning light system, or the like. For ease of explanation, the illumination systems 12(1)-(n) will be generally referred to hereinafter as "turn signal system 12," though this is not a limitation of the present disclosure unless specifically claimed as such.

Figure 2:
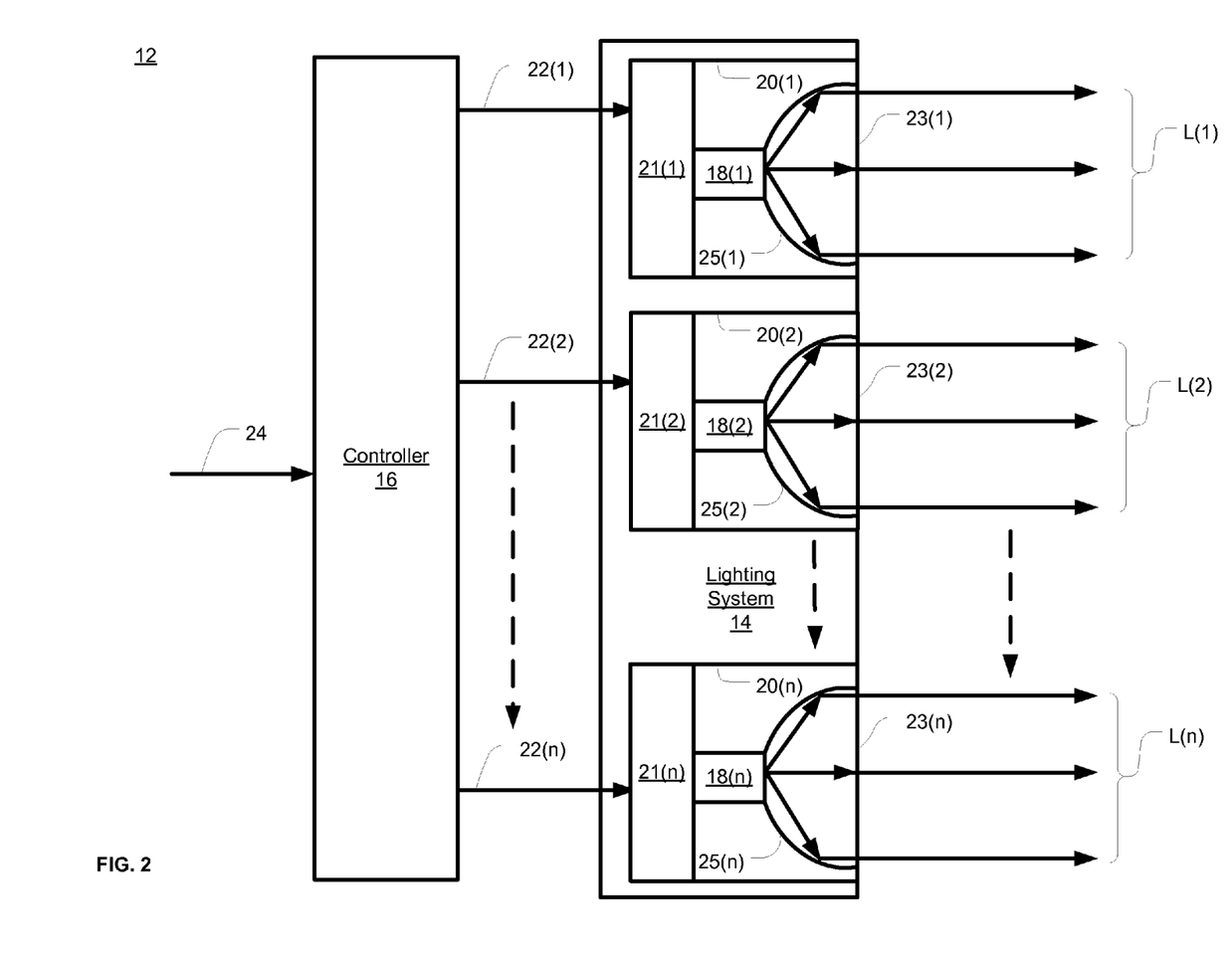
FIG. 2 illustrates one embodiment of an illumination system consistent with the present disclosure.

One embodiment of a turn signal system 12 is generally illustrated in FIG. 2. The turn signal system 12 includes a lighting system 14 and a controller 16. The lighting system 14 includes at least three light engines 18(1)-(n) which are configured to be selectively illuminated. The light engines 18(1)-(*n*) may include any known light source configuration such as one or more incandescent light source (such as, but not limited to, a halogen lamp), LEDs (with or without a remote phosphor element), a gas discharge light source such as a fluorescent tube (e.g., in a compact fluorescent (CFL) lamp), and/or a high-intensity discharge (HID) light source. One or more of the light engines 18(1)-(*n*) may include a single light source (e.g., a single LED). In certain embodiments, each of all the light engines 18(1)-(*n*) consists of a single light source such as a single LED. Alternatively (or in addition), one or more of the light engines 18(1)-(*n*) may include multiple light sources depending on the application. For example, a light engine 18 may include multiple LEDs mounted on one or more printed circuit boards (PCBs) 21 configured to be simultaneously illuminated upon receipt of an illumination signal 22. The light engines 18(1)-(*n*) may all be the same or one or more of the light engines 18(1)-(*n*) may be different (e.g., different photometric properties).

Optionally, the light engines 18(1)-(*n*) may be at least partially disposed within one or more housings 20(1)-(*n*). While the light engines 18(1)-(*n*) have been illustrated arranged in a line, the turn signal system 12 consistent with the present disclosure may include light engines 18(1)-(*n*) arranged in a curved line, circle, oval, triangle, or the like. The housings 20(1)-(*n*) may include a plurality of individual lens 23(1)-(*n*) each associated with one of the light engine 18(1)-(*n*)). Alternatively, the light engines 18(1)-(*n*) may be disposed within a single housing 20 which may include one or more lenses 23(1)-(*n*) covering a plurality of the light engines 18(1)-(*n*) (e.g., a single lens 23 covering the plurality of light engines 18(1)-(*n*). The plurality of light engines 18(1)-(*n*) may optionally each include an associated reflector 25(1)-(*n*). The reflectors 25(1)-(*n*) (and optionally the lenses 23(1)-(*n*)) may be configured to focus the light emitted from the light engines 18(1)-(*n*) into one or more desired light patterns L(1)-(*n*).

The controller 16 is configured is configured to generate one or more illumination signals 22(1)-(*n*) for selectively illuminating the light engines 18(1)-(*n*) of the lighting system 14 in the desired illumination sequence/pattern. The controller 16 may generate the illumination signals 22(1)-(*n*) upon receiving one or more input signals 24. The input signals 24 may be generated by an operator of the vehicle 10 (FIG. 1) and/or a part of the engine control unit (ECU) (or a related subcontroller) associated with the vehicle 10 (not shown). The illumination signals 22(1)-(*n*) may each be configured to selectively illuminate an associated one of the light engines 18(1)-(*n*). Alternatively, the illumination signals 22(1)-(*n*) may represent different combinations of illuminated light engines 18(1)-(*n*). For example, a single illumination signal 22 may be configured to cause multiple light engines 18(1)-(*n*) to illuminate.

While the exact illumination sequence/pattern will depend upon the number of light engines 18(1)-(*n*) in the turn signal system 12 as well as a desired aesthetic feature, the controller 16 is configured to generate illumination signals 22(1)-(*n*) upon initiation of the illumination sequence/pattern to simultaneously illuminate at least two of the light engines (e.g., light engines 18(1) and 18(2)) while not illuminating at least one of the light engines (e.g., light engine **18(*n*)). The controller 16 is further configured to alternate which light engine 18(1)**-(*n*) is not illuminated and which two (or more) light engines 18(1)-(*n*) are simultaneously illuminated. As such, at least two of the light engines 18(1)-(*n*) are always illuminated during the illumination sequence. The illumination sequence may be predefined (i.e., set during the manufacturing or installation of the turn signal system 12 in an automobile) and/or user selectable (i.e., selected by an operator of the automobile).

As discussed above, the novel illumination sequence/pattern allows the turn signal system 12 to comply with applicable regulatory requirements based on the desired regions where the turn signal system 12 is to be used. One such applicable regulation is described in 49 C.F.R. §571, also known as the Federal Motor Vehicle Safety Standards (FMVSS). More specifically FIG. 1B in 49 C.F.R. §571.108 describes the minimum and maximum allowable candlepower values for original and replacement lamps, reflective devices, and associated equipment, a copy of which is reproduced in TABLE 1 below.

TABLE 1

|  | Lighted sections | | |
|---|---|---|---|
| Lamp | 1 | 2 | 3 |
| Stop | 80/300 | 95/360 | 110/420 |
| Tail[1] | 2/18 | 3.5/20 | 5.0/25 |
| Parking[2] | 4.0/125 | | |
| Red turn signal | 80/300 | 95/360 | 110/420 |
| Yellow turn signal rear | 130/750 | 150/900 | 175/1050 |
| Yellow turn signal front | 200/— | 240/— | 275/— |
| Yellow turn signal front[3] | 500/— | 600/— | 685/— |

[1]Maximum at H or above.
[2]The maximum candlepower value of 125 applies to all test points at H or above. The maximum allowable candlepower value below H is 250.
[3]Values apply when the optical axis (filament center) of the front turn signal is at a spacing less than 4 in. (10 cm.) from the lighted edge of the headlamp unit providing the lower beam, or from the lighted edge of any additional lamp installed as original equipment and which supplements the lower beam.

As may be appreciated, the minimum value increase as the number of lighted sections increase. As discussed above, this increase in the minimum value is problematic for the known sequential lighting systems which initially illuminate a single light source. In particular, the single light source, e.g. an incandescent bulb, which is initially illuminated is generally large and expensive in order to satisfy the minimum requirement. Moreover, the known sequential lighting systems may be inefficient. In particular, because the single light source which is initially illuminated must satisfy the minimum requirement upon initiation of the illumination sequence, the additional light sources (when illuminated) produce light in excess of the minimum requirements. Furthermore, the known sequential lighting systems may be difficult/complex to design because the total light output of the system (i.e., when all of the light sources are illuminated) must not exceed the maximum value (e.g., as described in TABLE 1 above). For aesthetic reasons or for reasons of commonality and interchangeability of replacement parts so as to avoid stocking additional part numbers or "SKUs" (stock keeping units), however, there may be a desire that all of the light sources produce the same amount of light when illuminated. As such, the known sequential lighting systems may require a complex controller which effectively reduces the light output of each light as an additional light is illuminated in the sequence such that each light produces the same amount of light as an additional light is illuminated, while not exceeding the maximum value under the regulations. Additionally, the known sequential lighting systems may use a plurality of different light sources.

In contrast, the novel illumination sequence/pattern of the present disclosure allows the turn signal system 12 to comply with applicable regulatory requirements, while also allowing the turn signal system 12 to use smaller, cheaper, and/or more efficient light engines 18(1)-(*n*), thereby reducing the cost and complexity of the turn signal system 12. This unexpected result may be achieved by simultaneously illuminating at least two light engines at all times while alternating which one (or more) of the light engines is not illuminated. Moreover, the turn signal system 12 consistent with the present disclosure may be less complex and less expensive to manufacture compared to the known sequential lighting systems. For example, in contrast to the known sequential lighting systems discussed above, all of the light engines 18(1)-(n) of the turn signal system 12 consistent with the present disclosure may be the same. Moreover, the turn signal system 12 consistent with the present disclosure may feature a less complex controller 16. For example, the controller 16 does not need to reduce the power to each light engine 18(1)-(n) as the sequence progresses because the same number of light engines 18(1)-(n) may always be illuminated, and therefore the total light output may always be the same. The surprising visual effect, which differs from the prior art, therefore provides an attention-grabbing visual display whereby the visual cue to bystanders appears to move as a signal from right to left (see, for example, the sequence in FIGS. 4-6 herein below) as a dark, unlit region contrasting against an apparently lit background, in contrast to the prior art.

Figure 3:
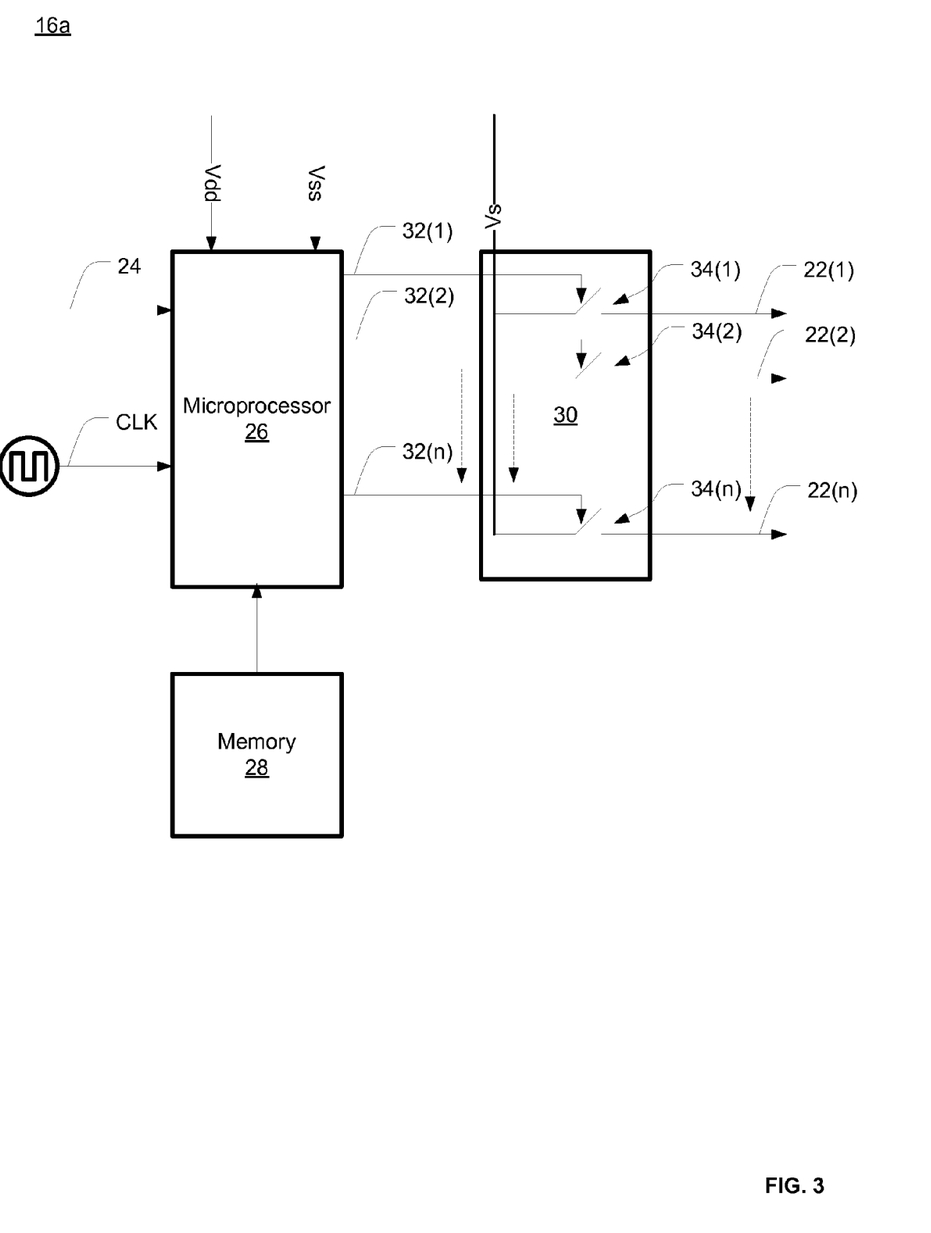
FIG. 3 illustrates one embodiment of a controller consistent with the present disclosure.

Turning now to FIG. 3, a controller 16a consistent with one embodiment of the present disclosure is generally illustrated. It should be understood that controller 16a is merely one example, and that numerous other embodiments of a controller consistent with the present disclosure are possible. The controller 16a includes a microprocessor 26 configured to be coupled to the power rails (e.g., Vss and Vdd), memory 28, and a switch network 30. The microprocessor 26 is configured to generate one or more switching signals 32(1)-(n) based on one or more input signals 24, instructions stored on the memory 28, and a clock signal (CLK) or the like. For example, the microprocessor 26 may execute the instructions stored in memory 28 upon receiving the input signal 24 to generate switching signals 32(1)-(n). The rate/timing of the switching signals 32(1)-(n) may be based on the clock signal CLK. The switch signals 32(1)-(n) are configured to control the operation of the switch network 30, thereby selectively illuminating the light engines 18(1)-(n) of the lighting system 14 (FIG. 2) to create the illumination pattern.

The switch network 30 includes a plurality of switches 34(1)-(n), for example, wherein the switches 34(1)-(n) each correspond to an associated one of the light engines 18(1)-(n). Each switch 34(1)-(n) may be configured to selectively electrically connect an associated light engine 18(1)-(n) with a power source Vs. The switches 34(1)-(n) may be responsive to the switch signals 32(1)-(n) to control the operational state (i.e., open or closed) of the switches 34(1)-(n). The switches 34(1)-(n) may therefore generate illumination signals 22(1)-(n) configured to selectively energize the plurality of light engines 18(1)-(n).

Figure 4:
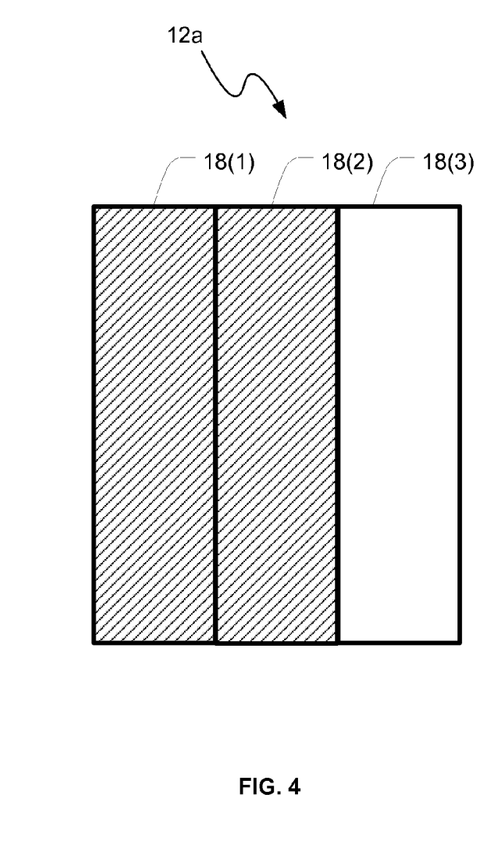
FIGS. 4-6 illustrate one embodiment of an illumination sequence consistent with the present disclosure.
Figure 5:
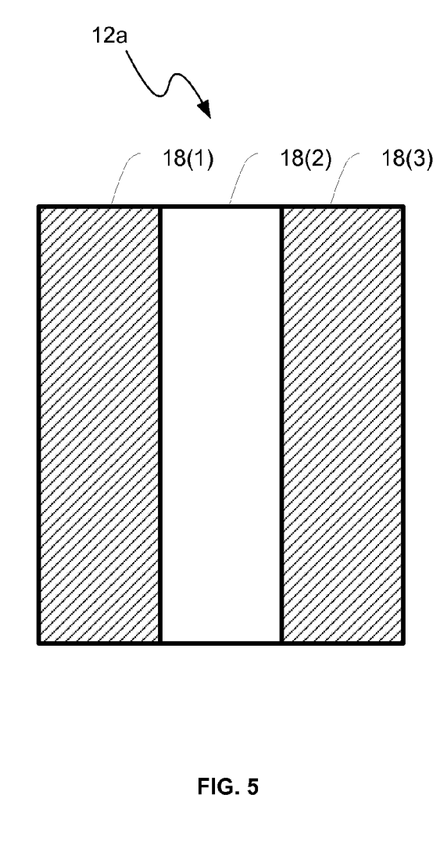
Figure 6:
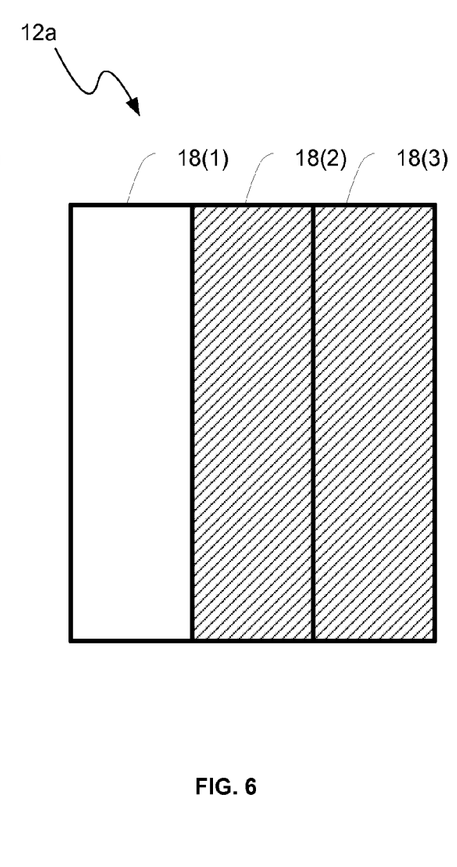

With reference to FIGS. 4-6, one embodiment of an illumination sequence consistent with the present disclosure is generally illustrated for a turn signal system 12a including three light engines 18(1), 18(2), and 18(3). For ease of explanation, an illuminated light engine 18 is illustrated with crosshatching whereas a non-illuminated light engine 18 is illustrated without crosshatching. Additionally, the controller associated with the turn signal system 12a is not shown for simplicity.

Upon receipt of an input signal, the controller is configured to initially cause two light engines (e.g., light engines 18(1) and 18(2)) to illuminate while the third light engine 18(3) is not illuminated as generally illustrated in FIG. 4. After some determined amount of time $T_1$ (which may be set by the operator of the vehicle 10 and/or by the manufacturer of the turn signal system 12), the controller is configured to cause a different combination of two light engines (e.g., light engines 18(1) and 18(3)) to illuminate while turning off one of the light engines (e.g., light engine 18(2)) which was illuminated in the previous combination as generally illustrated in FIG. 5. Again, after another determined amount of time $T_2$ (which may be the same or different than $T_1$), the controller is configured to cause a different combination of two light engines (e.g., light engines 18(2) and 18(3)) to illuminate while turning off one of the light engines (e.g., light engine 18(1)) which was illuminated in the previous combination as generally illustrated in FIG. 6. The illumination sequence may start over again at FIG. 4. Alternatively, the sequence may subsequently illuminate all of the light engines 18(1)-(3) and/or subsequently turn off all of the light engines 18(1)-(3).

Turning now to FIGS. 7-10, another embodiment of an illumination sequence consistent with the present disclosure is generally illustrated for a turn signal system 12b including four light engines 18(1)-(4). For ease of explanation, an illuminated light engine 18 is illustrated with crosshatching whereas a non-illuminated light engine 18 is illustrated without crosshatching. Additionally, the controller associated with the turn signal system 12b is not shown for simplicity. Again, it should be appreciated that the following illumination sequence is provide for illustrative purposes, and the present disclosure is not limited to this illumination sequence unless specifically claimed as such. The sequence illustrated in FIGS. 7-10 could be realized in a lamp located at the left rear of an automobile in signaling a left turn.

Figure 7:
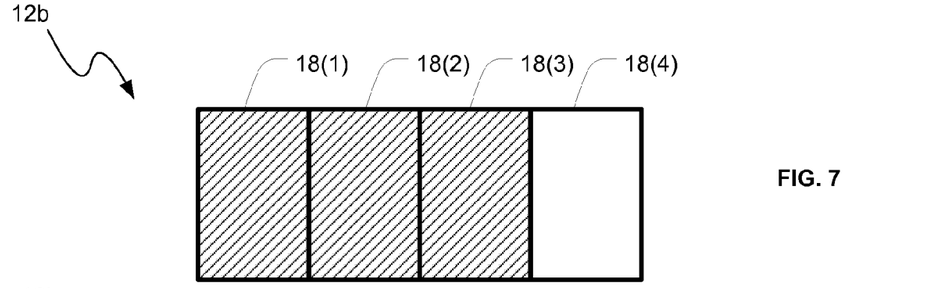
FIGS. 7-10 illustrate another embodiment of an illumination sequence consistent with the present disclosure.
Figure 8:
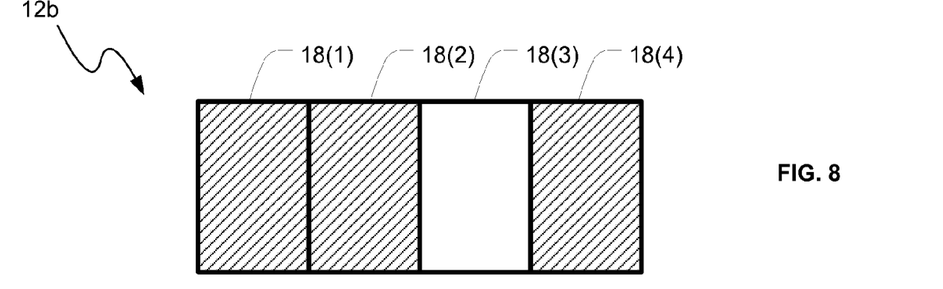
Figure 9:
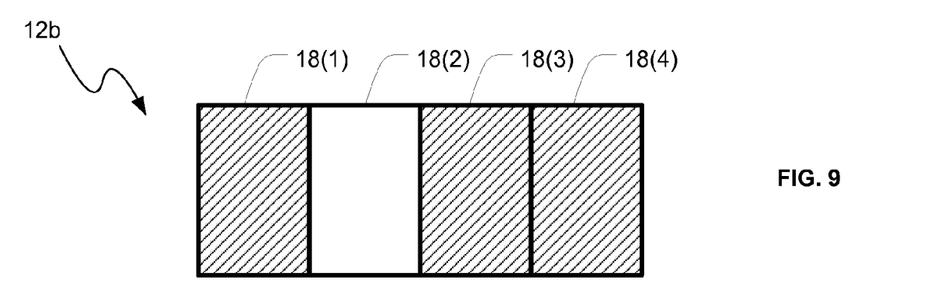
Figure 10:
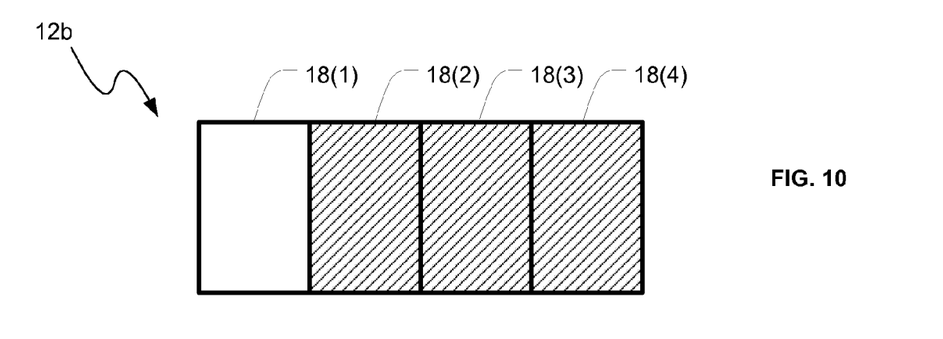

The illumination sequence may begin at FIG. 7. In particular, the controller may initially illuminate three light engines (e.g., light engines 18(1), 18(2), and 18(3)) upon receiving an input signal. The controller may subsequently illuminate other combinations of the light engines 18 while not illuminating at least one light engine 18 as generally illustrated in FIGS. 8-10. As may be seen, the non-illuminated light engine 18 may move from one end (e.g., the right end as illustrated) of the turn signal system 12b to the other end (e.g., the left end as illustrated) of the turn signal system 12b as the illumination pattern progresses. While the light engines 18(1)-(4) have been illustrated arranged in a line, the turn signal system 12b consistent with the present disclosure may be arranged in a curved line, circle, oval, or the like. Additionally, while only one light engine 18 is shown not illuminated during the illumination sequence, it should be understood that any number of light engines 18 may not be illuminated depending on the total number of light engines 18 in the turn signal system 12b, provided that at least two light engines 18 are simultaneously illuminated at all time during the illumination sequence.

While all of the light engines 18 in FIGS. 7-10 are illuminated except one (which moves), it should be understood that this is not a limitation of the present disclosure unless specifically claimed as such. The turn signal system 12b should always have at least two light engines 18 that are simultaneously illuminated after receiving the input signal and one (or more) light engines 18 which is not illuminated. As such, the light engines 18 may be selected such that the combination of illuminated light engines 18 meets or exceeds the photometric requirements of any application regulation even though the photometric properties of each individual light engine 18 is less than the photometric requirements of any application regulation. Accordingly, each of the light engines 18 of the turn signal system 12b may be smaller and/or less expensive compared to other sequential turn signal designs, while still meeting and/or exceeding the photometric requirements of the applicable vehicle regulation(s) and still providing an aesthetically pleasing appearance. Because each of the light engines 18 may have a lower luminosity compared to other sequential turn signal designs, the turn signal system 12b may produce less heat. As such, the design and manufacture of a turn signal system 12b consistent with the present disclosure may be easier and less expensive to manufacturer. Additionally, a turn signal system 12b consistent with the present disclosure may fit into a wider range of vehicle applications compared to other sequential turn signal designs because the overall size of the turn signal system 12b may be reduced due to the smaller light engines 18 and the lower amount of heat generated.

Figure 11:
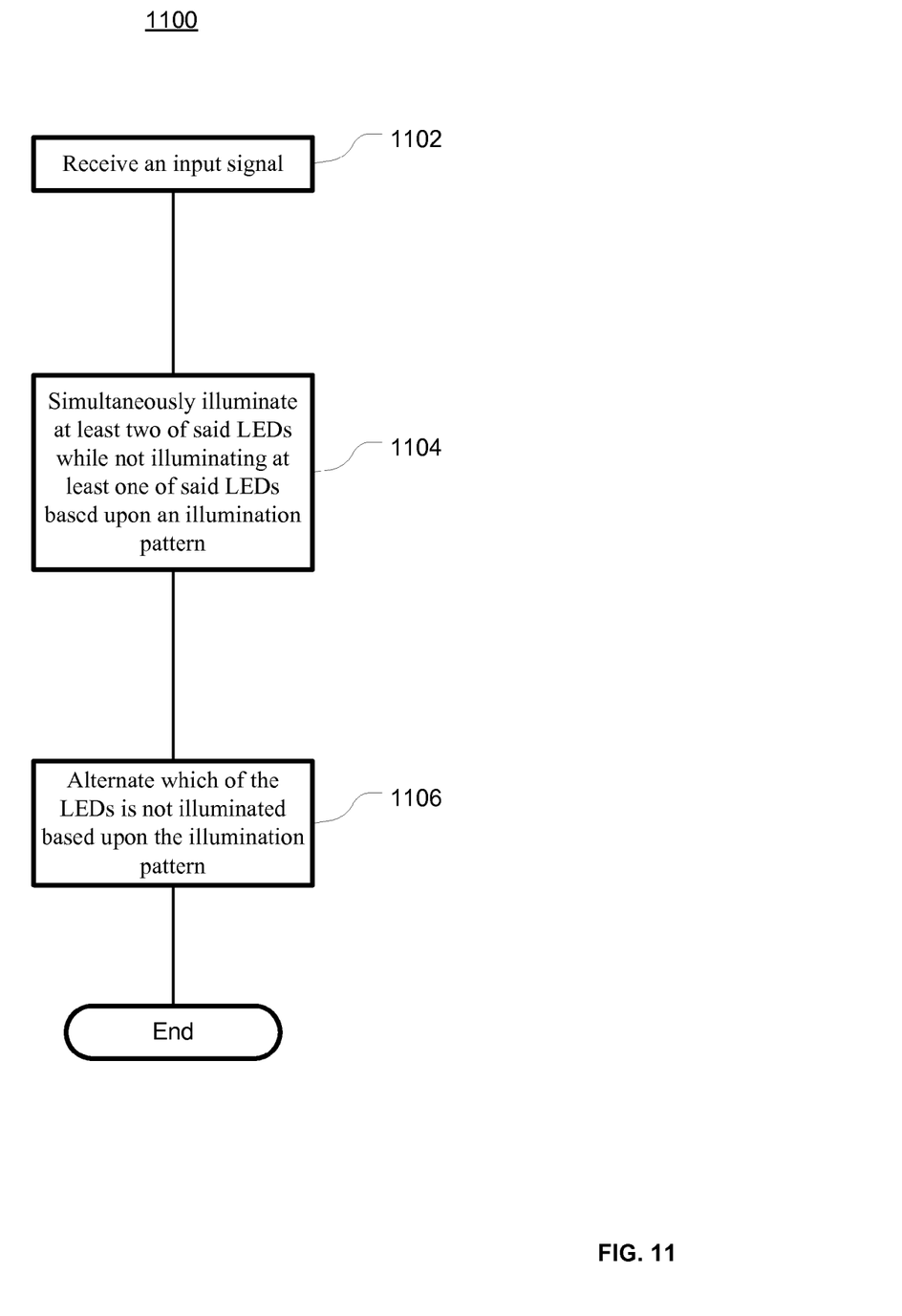
FIG. 11 illustrates a flowchart of operations of one embodiment of a method consistent with the present disclosure.

With reference to FIG. 11, a flowchart of operations 1100 for a method for illuminating an illumination system having at least three light engines based on an illumination sequence consistent with embodiment of the present disclosure is generally illustrated. The method includes receiving an input signal (operation 1102). The input signal is configured to initiate the illumination sequence of the illumination system. The method also includes simultaneously illuminating at least two of the light engines while not illuminating at least one of the light engines upon initiation of the illumination sequence (operation 1104). The method further includes alternating which of the light engines are not illuminated and which of the light engines are simultaneously illuminated based upon the illumination sequence such that at least two of the light engines are always illuminated during the entire illumination sequence (operation 1106).

While FIG. 11 illustrates a method of operations according various embodiments, it is to be understood that in any such embodiment not all of these operations are necessary. Indeed, it is fully contemplated herein that in other embodiments of the present disclosure, the operations depicted in FIGS. 1-10 may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect, the present disclosure features a method of illuminating an illumination system (12) having at least three light engines (18). The method includes receiving an input signal (24), the input signal (24) configured to initiate an illumination sequence of the illumination system (12); upon initiation of the illumination sequence, simultaneously illuminating at least two of the light engines (18) while not illuminating at least one of the light engines (18); and alternating which of the light engines (18) are not illuminated and which of the light engines (18) are simultaneously illuminated, wherein at least two light engines (18) are simultaneously illuminated during the entire illumination sequence.

According to another aspect, the present disclosure features an illumination system (12). The illumination system (12) includes a lighting system (14) comprising at least three light engines (18) and a controller (16). The controller (16) is configured to simultaneously illuminate at least two of the light engines (18) while simultaneously not illuminating at least one of the light engines (18) upon activation of an illumination sequence of the illumination system (12). The controller (16) is further configured to alternate which of the light engines (18) are illuminated and which of the light engines (18) are not illuminated, wherein at least two light engines (18) are simultaneously illuminated during the entire illumination sequence.

The terms "first," "second," "third," and the like herein do not denote any order, quantity, or importance, but rather are used to distinguish one element from another, and the terms "a" and "an" herein do not denote a limitation of quantity, but rather denote the presence of at least one of the referenced item. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

As used in any embodiment herein, the term "module" refers to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The following is a list of reference numeral used in the specification:
  10 vehicle
  12, 12(1), 12(b) illumination system (generally referred to as illumination system 12)
  14 lighting system
  16, 16a controller (generally referred to as controller 16)
  18(1)-(n) light engines (generally referred to as light engines 18)
  20(1)-(n) housing (generally referred to as housing 20)
  21(1)-(n) printed circuit board (generally referred to as printed circuit board 21)

22(1)-(n) illumination signals (generally referred to as illumination signals 22)
23(1)-(n) lenses (generally referred to as lenses 23)
24 input signal
25(1)-(n) reflectors (generally referred to as reflectors 25)
26 microprocessor
28 memory
30 switch network;
32(1)-(n) switching signals (generally referred to as switching signals 32)
34(1)-(n) switches (generally referred to as switches 34)
L(1)-(n) light pattern
Vss negative supply ground
Vdd positive supply voltage
CLK clock signal.

The invention claimed is:

1. A method of illuminating an illumination system (12) having at least three light engines (18), said method comprising:
receiving an input signal (24), said input signal (24) configured to initiate an illumination sequence of said illumination system (12);
upon initiation of said illumination sequence, simultaneously illuminating at least two of said light engines (18) while not illuminating at least one of said light engines (18); and
alternating which of said light engines (18) are not illuminated and which of said light engines (18) are simultaneously illuminated, wherein at least two light engines (18) are simultaneously illuminated during said entire illumination sequence, and
during a single said entire illumination sequence, alternating in succession each of said at least two light engines (18(1), 18(2)) that are initially illuminated to being not illuminated and then subsequently again illuminating at least one (18(1)) of said non-illuminated two initially illuminated light engines.

2. The method of claim 1, wherein each of said light engines (18) has a maximum luminosity which is less than an amount required by applicable regulation in a geographically desired region.

3. The method of claim 2, wherein each of said light engines (18) has a maximum luminosity which is less than 175 candlepower and wherein a combined luminosity of said illuminated light engines is greater than or equal to 175 candlepower.

4. The method of claim 3, wherein said combined luminosity of said illuminated light engines (18) is less than 1050 candlepower.

5. The method of claim 3, wherein each of said light engines (18) generates a constant amount of light when illuminated during said illumination sequence.

6. The method of claim 5, wherein said illumination sequence is selectable by a user.

7. The method of claim 1, wherein each of said light engines (18) consists of a single light emitting diode (LED).

8. The method of claim 1, wherein each of said light engines (18) includes at least one light emitting diode (LED).

9. The method of claim 1, wherein said illumination sequence alternates said non-illuminated light engine (18) from a respective one of said light engines (18) to an adjacent light engine (18).

10. The method of claim 9, further comprising progressively alternating said non-illuminated light engine (18) from a first end of said illumination system (12) towards a second end of said illumination system (12).

11. An illumination system (12) comprising:
a lighting system (14) comprising at least three light engines (18); and
a controller (16) configured to simultaneously illuminate at least two of said light engines (18) while simultaneously not illuminating at least one of said light engines (18) upon activation of an illumination sequence of said illumination system (12), said controller (16) further configured to alternate which of said light engines (18) are illuminated and which of said light engines (18) are not illuminated, wherein at least two light engines (18) are simultaneously illuminated during said entire illumination sequence, and
wherein said controller, during a single said entire illumination sequence, is configured to alternate in succession each of said at least two light engines ((18(1), 18(2)) that are initially illuminated upon activation of the illumination sequence to being not illuminated and then subsequently illuminates at least one (18(1)) of said two non-illuminated initially illuminated light engines (18(1), 18(2)) to being again illuminated.

12. The illumination system (12) of claim 11, wherein each of said light engines (18) has a maximum luminosity which is less than an amount required by applicable regulation in a geographically desired region.

13. The illumination system of claim 12, wherein each of said light engines (18) has a maximum luminosity which is less than 175 candlepower and wherein a combined luminosity of said illuminated light engines is greater than or equal to 175 candlepower.

14. The illumination system (12) of claim 11, wherein said light engines (18) are arranged in a row in a housing (20) of said lighting system (14), and wherein said controller (16) is further configured to progressively alternate said non-illuminated light engine (18) from a first end of said row towards a second end of said row.

15. The illumination system (12) of claim 11, wherein each of said light engines (18) comprises at least one light emitting diode (LED).

16. The method of claim 1, further comprising, during said single said entire illumination sequence,
alternating in succession each of said at least two light engines that are initially illuminated to being not illuminated and then subsequently to being again illuminated.

17. The method of claim 1, further comprising repeating said entire illumination sequence.

18. The illumination system (12) of claim 11, wherein said controller, during said single said entire illumination sequence, alternates in succession each of said at least two light engines that are illuminated upon activation of the illumination sequence to being not illuminated and then subsequently to being again illuminated.

19. The illumination system (12) of claim 11, wherein said controller is configured to repeat said entire illumination sequence.

20. A method of illuminating an illumination system (12) having at least three light engines (18), said method comprising:
receiving an input signal (24) said input signal (24) configured to initiate an illumination sequence of said illumination system (12);
upon initiation of said illumination sequence, simultaneously illuminating at least two of said light engines (18) while not illuminating at least one of said light engines (18);
alternating which of said light engines (18) are not illuminated and which of said light engines (18) are simultaneously illuminated, wherein at least two light engines (18) are simultaneously illuminated during said entire illumination sequence;
during a single said entire illumination sequence, alternating in succession each of said at least two light engines (18(1), 18(2))) that are initially illuminated to being not illuminated and
changing only once, during said single said entire illumination sequence, a state of the at least one said light engine initially not illuminated.

\* \* \* \* \*